United States Patent [19]

Kamarei

[11] Patent Number: 6,030,650
[45] Date of Patent: Feb. 29, 2000

[54] COMPLETE NUTRITIONAL MILK COMPOSITIONS AND PRODUCTS

[75] Inventor: A. Reza Kamarei, Princeton, N.J.

[73] Assignee: Princeton Nutrition, L.L.C., Princeton, N.Y.

[21] Appl. No.: 09/305,074

[22] Filed: May 4, 1999

Related U.S. Application Data

[63] Continuation-in-part of application No. 08/975,692, Nov. 21, 1997, Pat. No. 5,985,339
[60] Provisional application No. 60/031,637, Nov. 22, 1996.

[51] Int. Cl.[7] .............................. A23L 1/304; A23C 9/00
[52] U.S. Cl. .............................. 426/72; 426/74; 426/233; 426/324; 426/521; 426/548; 426/648; 426/656; 426/657; 426/658; 229/213
[58] Field of Search .............................. 426/72, 74, 233, 426/324, 521, 541, 548, 648, 656, 657, 658; 229/213

[56] References Cited

U.S. PATENT DOCUMENTS

| | | | |
|---|---|---|---|
| 2,379,586 | 7/1945 | Manning et al. | 99/11 |
| 3,097,947 | 7/1963 | Kemmerer et al. | 99/63 |
| 3,385,714 | 5/1968 | Smith | 99/171 |
| 3,536,494 | 10/1970 | Johnson | 99/11 |
| 3,950,547 | 4/1976 | Lamar, III et al. | 426/74 |
| 4,070,488 | 1/1978 | Davis | 426/72 |
| 4,112,123 | 9/1978 | Roberts | 426/72 |
| 4,235,936 | 11/1980 | Kahn et al. | 426/330.3 |
| 4,268,529 | 5/1981 | Davis et al. | 426/72 |
| 4,332,824 | 6/1982 | Kahn et al. | 426/330.3 |
| 4,414,238 | 11/1983 | Schmidl | 426/602 |
| 4,486,413 | 12/1984 | Wisenberger et al. | 424/177 |
| 4,490,401 | 12/1984 | Becker et al. | 426/407 |
| 4,497,800 | 2/1985 | Larson et al. | 514/2 |
| 4,710,387 | 12/1987 | Uiterwaal et al. | 426/72 |
| 4,801,466 | 1/1989 | Clyne et al. | 426/232 |
| 4,803,087 | 2/1989 | Karinen | 426/73 |
| 4,853,246 | 8/1989 | Stevens | 426/580 |
| 4,992,282 | 2/1991 | Mehansho et al. | 426/72 |
| 5,064,674 | 11/1991 | Girsh | 426/580 |
| 5,104,677 | 4/1992 | Behr et al. | 426/590 |
| 5,126,162 | 6/1992 | Erasmus | 426/657 |
| 5,200,226 | 4/1993 | Rodriguez | 426/585 |
| 5,266,343 | 11/1993 | Stauffer | 426/522 |
| 5,415,885 | 5/1995 | Owades et al. | 426/590 |
| 5,416,077 | 5/1995 | Hwang et al. | 514/54 |
| 5,421,512 | 6/1995 | Poole | 229/249 |
| 5,431,939 | 7/1995 | Cox et al. | 426/300 |
| 5,447,741 | 9/1995 | Goldman | 426/580 |
| 5,449,523 | 9/1995 | Hansen et al. | 426/42 |
| 5,470,597 | 11/1995 | Mendenhall | 426/521 |
| 5,514,391 | 5/1996 | Bushnell et al. | 426/237 |
| 5,520,948 | 5/1996 | Kvamme | 426/590 |
| 5,555,702 | 9/1996 | Sizer | 53/127 |
| 5,558,897 | 9/1996 | Goldman | 426/580 |
| 5,641,531 | 6/1997 | Liebrecht et al. | 426/583 |

OTHER PUBLICATIONS

M. J. Lewis, Heat Treatment of Milk, In: Modern Dairy Technology, vol. 1 Advances in Milk Processing, 2nd Edition, Chapman & Hall, 1994.

I. Rosenthal, Milk and Dairy Products—Properties and Processing, Balaban Publishers, 1991.

H. Burton, Ultra–High–Temperature Processing of Milk and Milk Products, Elsevier Applied Science, 1988.

G. Bonin et al., Fluid Milk, in: Dairy Science and Technology—Principles and applications, les presses de l'universite laval, Quebec, 1985.

R. Early, The Technology of Dairy Products, VCH Publishers, NY, 1992.

A.H. Varnam and J.P. Sutherland, Milk and Milk Products—Technology, Chemistry, and Microbiology, Chapman & Hall, 1994.

Preventing Microbial Contamination of Enteral Formulas and Delivery System, Ross Product Division, Abbott Laboratories, Columbus, Ohio Apr. 1996.

Ross Medical Nutritional System, A Total Commitment to Enteral Nutrition, 1995, pp. 2–3, 6–15, 18–19, 22–39, 44–49, 52–57.

Ross Products Division, Abbott Laboratories, Jan. 1996, Advertisement for Ensure® Light.

Mead Johnson, Enteral Systems Guide, 1994, pp. 2–11, 18–25, 30, 34–37.

Mead Johnson, Boost® Nutritional Energy Drink Advertisement, 1995.

Mead Johnson, Kangaroo® Delivery Systems Advertisement, 1996.

Mead Johnson Nutritionals, Sep. 1996, Advertisement.

Sandoz Nutrition, Enteral Products Pocket Guide, 1995, pp. 4–27, 30–39.

Clintec, Enteral Product Guide, 1994, pp. 2–3, 10–13, 20–29, 34–67.

Sherwood Medical, Enteral Formulas, 1995, pp. 6–11, 14–17, 20–21, 24–25.

*Primary Examiner*—Chhaya D. Sayala
*Attorney, Agent, or Firm*—Hoffman & Baron, LLP

[57] ABSTRACT

Complete nutritional milk compositions and products such as unflavored and flavored milks, yogurts, ice creams and frozen yogurts can be prepared through pasteurization, ultra-pasteurization or sterilization processes. By varying the choice and quantity of nutritional and functional ingredients, compositions which include a milk comprise, per service size: from about 0.1% to about 20% of the daily value of Sodium, Potassium, vitamin A, and vitamin C; from about 0.1% to about 40% of the daily value of Calcium; from about 0.1% to about 20% of the daily value of iron; from about 0.1% to about 30% of the daily value of vitamin D; from about 0.1% to about 20% of the daily value of vitamin E, vitamin K and Thiamine; form about 0.1% to about 30% of the daily value of Riboflavin; from about 0.1% to about 20% of the daily value of Niacin, vitamin B6, Folate, vitamin B12, Biotin, and Pantothenic acid; from about 0.1% to about 30% of the daily value of Phosphorus; and from about 0.1% to about 20% of the daily value of Iodine, Magnesium, Zinc, Selenium, Copper, Manganese, Chromium, Molybdenum, and Chloride; wherein the percent daily value (D.V.) is based on a 2,000 calorie diet.

34 Claims, No Drawings

COMPLETE NUTRITIONAL MILK COMPOSITIONS AND PRODUCTS

RELATED APPLICATIONS

The present application is a continuation-in-part of U.S. Ser. No. 08/975,692, filed Nov. 21, 1997, now U.S. Pat. No. 5,985,339, which is incorporated in its entirety herein by reference, which claims priority to U.S. Provisional application Ser. No. 60/031,637, filed Nov. 22, 1996 which is incorporated in its entirety herein by reference.

FIELD OF THE INVENTION

This invention relates to the field of complete nutritional compositions and products and more particularly to complete nutritional milk compositions and products which are prepared using pasteurization, ultra-pasteurization or sterilization processes. This invention further relates to the preparation of complete nutritional unflavored or flavored milks, ice creams and yogurts.

BACKGROUND OF THE INVENTION

Nutrition is one of the cornerstones of health, well-being, and the prevention of numerous chromic diseases. Nutritional products play an important role in these areas and attempts to provide readily available and convenient nutritional products to the general public has been a major focus in recent years. To remain healthy one must receive essential nutrients which are indispensable to human nutrition. Essential nutrients include both macronutrients, such as fats, carbohydrates and proteins, and micronutrients, such as vitamins and minerals (including trace elements and electrolytes). Table 1 shows a list of essential macronutrients and micronutrients and corresponding percent daily value (D.V.) of these essential nutrients based on a 2,000 calorie diet as currently specified by governmental regulations, 21 C.F.R. 101.9, 1998. Electrolytes include sodium, potassium and chloride.

Nutritionally compete and balanced foods are important for ensuring that the public receives all essential nutrients. The public should not be encouraged to receive incomplete or imbalanced nutrition with food or liquids that are perceived or marketed to have nutritional benefits. Consumption of nutritionally incomplete foods or liquids that do not contain all the essential nutrients as listed in Table 1 will not necessarily provide complete nutritional well-being. Furthermore, a nutritionally imbalanced product can result in over consumption or under consumption of essential nutrients because some nutrients are presented in very high concentrations while other nutrients are presented in very low concentrations. A balance of essential nutrients, especially micronutrients, is often recommended for optimal nutritional well-being.

As an example of complete and balanced nutrition, consider the need and interaction of just three micronutrients, such as, vitamin D, calcium and phosphorus. Vitamin D is necessary for the absorption of calcium and phosphorus in the same intestine of humans which is important in normal growth and mineralization of skeleton and teeth. A deficiency in vitamin D can lead to rickets in young children and to osteomalacia in adults. Excessive consumption of vitamin D, however, can cause hypercalcemia with anorexia, nausea, polyuria, polydipsia, anxiety, pruritus and altered renal function. Furthermore, a balance of calcium and phosphorus is needed for healthy bones and teeth. A diet deficient in one of these micronutrients can directly effect the body's ability to utilize the other two micronutrients. An imbalance of micronutrients, such as excessive calcium and deficient phosphorus, and also cause health problems because a balance of these minerals is required for healthy bones and teeth. Thus, the balancing of essential nutrients in desirably quantities is necessary for health and well-being.

Milk products constitute a significant portion of the overall diet or caloric consumption of human beings. As such, milk products have a major role in maintaining the health of the public. Nutritionally optimal milk products will have a positive effect on the nutrition and the health of the public. Concentration of macronutrients in any given milk product will often depend on the nature of the product and the desirable profile developed by the manufacturer. For example, levels of macronutrients can be manipulated in products such as fat free milk, protein fortified chocolate milk and artificially sweetened ice cream.

Nutrition facts of commercially available flavored milks, including organic milk and soy milk, are presented in Tables 2A and 2B. The total fat contents vary with the product profile. For example, a fat free milk will have less total fat than a 1% milk fat product, and both of these products will have lower total fat levels than a full milk fat product. Most of the milk products in Tables 2A and 2B, however, are deficient in a significant number of micronutrients. Many of these micronutrient-deficient milk products contain only sodium, vitamin A, vitamin C, calcium and possibly iron as micronutrients. These micronutrient-deficient milk products are not considered complete nutritional products and may not offer the full health benefits associated with complete nutritional products.

Some commercially available milk products, as presented in Table 2B, are, however, fortified with many of the essential micronutrients. These fortified products generally have 35 to 50 percent of the daily value of many micronutrients present in a single serving. Nevertheless, even these fortified products are not complete nutritional products because some essential micronutrients are lacking from the product or are only present in insignificant or trace amounts. For example, essential micronutrients of vitamin K, folate, selenium, manganese, chromium, molybdenum and chloride are missing from these fortified milk products, resulting in an incomplete nutritional product. Furthermore, consumption of just several servings per day of these over-fortified products can lead to levels of micronutrients exceeding the recommended daily value for those fortified micronutrients. Such over consumption of a nutritionally incomplete, but somewhat nutritionally fortified product, may not result in desirable nutrition levels in the consuming public.

As with commercially available flavored milks, commercially available ice creams and frozen yogurts (see Table 3A and 3B) and commercially available yogurts (see Tables 4A and 4B) typically have incomplete and imbalanced micronutrient profiles. These ice creams and yogurts do not offer the nutritional benefits of a nutritionally complete and balanced product.

There is a need for nutritionally complete and nutritionally balanced milk products for consumption by the public without concern of over consumption of essential micronutrients especially those that are not naturally present in milk. The present invention meets these and other needs, as will come apparent in the description provided below.

THE SUMMARY OF THE INVENTION

The present invention relates to completer nutritional milk compositions and products which have been either pasteurized, ultra-pasteurized or sterilized and which are designed to include per serving size a specified percentage range of each essential micro-nutrient. The product is also designed to have a total calorie content of about 4% to 20% of the daily value per serving size. The daily value is based on a 2,000 calorie diet. The compositions of the present invention can optionally include non-essential but nutritionally functional components. The complete nutritional milk compositions of the present invention can be provided as unflavored milks, flavored milks, ice creams and yogurts.

A nutritional dairy-product having a composition which includes a milk and being thermally treated under conditions of pasteurization, ultra-pasteurization or sterilization comprising, per serving size from about 0.1% to about 20% of the daily value of Sodium, Potassium, vitamin A, and vitamin C; from about 0.1% to about 40% of the daily value of Calcium; from about 0.1% to about 20% of the daily value of iron; from about 0.1% to about 30% of the daily value of vitamin D; from about 0.1% to about 20% of the daily value of vitamin E, vitamin K and Thiamine; from about 0.1% to about 30% of the daily value of Riboflavin; from about 0.1% to about 20% of the daily value of Niacin, vitamin B6, Folate, vitamin B12, Biotin, and Pantothenic acid; from about 0.1% to about 30% of the daily value of Phosphorus; and from about 0.1% to about 20% of the daily value of Iodine, Magnesium, Zinc, Selenium, Copper, Manganese, Chromium, Molybdenum, and Chloride; wherein the percent daily value (D.V.) is based on a 2,000 calorie diet.

The nonfrozen compositions of the present invention are designed to be refrigeration shelf-stable. That is, the shelf-life will generally be up to about 16 weeks at temperatures of about 1° C. to 7° C. and preferably about 2° to about 3° C. These are conventional refrigeration temperature for dairy products. Shelf-life for pasteurized compositions of the present invention will generally be up to about 2 weeks, and for ultra-pasteurized compositions of the present invention, the shelf-life will be between about 4 to about 16 weeks.

The concentration of every single added vitamin must be calculated in a way that the effect of heat treatment and storage does not affect the label claim concentration of such vitamin. Table 6 shows the source and quantity of each vitamin (in the vitamin premix) to be used in the inventive standard complete nutritional milk product. Likewise, the concentration of every single added mineral must be calculated in a way that contribution of the same mineral from other ingredients does not affect the label claim concentration of such mineral. Table 7 shows the source and quantity of each mineral (in the mineral premix) to be used in the inventive standard complete nutritional milk product.

DETAILED DESCRIPTION OF THE INVENTION

The present invention relates to complete nutritional milk compositions and products which have been either pasteurized, ultra-pasteurized or sterilized and which are designed to include per serving size a specified percentage range of each essential micro-nutrient. The compositions of the present invention can optionally include non-essential but nutritionally functional components. The complete nutritional milk compositions of the present invention can be provided as unflavored milks, flavored milks, ice creams and yogurts.

The compositions of the present invention may be prepared by pasteurization, ultra-pasteurization or sterilization processes. The main purpose of these processes is the killing of pathogens which are the microorganisms causing disease in humans. Pasteurized products must be entirely free from pathogens. In fact, pasteurization of milk is required by law in most countries. The traditional pathogens in raw milk are *Mycobacerium bovis* which causes bovine tuberculosis (which also affects humans), *Brucella abortus* which transmits brucellosis (undulant fever) to man, Salmonella which are responsible for gastrointestinal diseases and typhoid fevers and *Campylobacter jejuni,* a common factor in enteritis.

A part from pathogenic microorganisms, milk also contains other substances and microorganisms which may spoil the taste and shelf-life of the product. A secondary purpose of these processes is therefore to destroy as many a possible of these other organisms in order to safeguard product quality. This requires more intensive heat treatment than is necessary to kill the pathogenic bacteria.

To ensure the destruction of all pathogenic microorganisms, it is necessary to heat the product to a given temperature and hold it at that temperature for a certain length of time before it is cooled again. The combination of temperature and holding time is very important as it determines the intensity of the heat treatment. The nutritional milk compositions of the present invention are pasteurized at about 75° C. to about 95° C. for about 15 to about 55 seconds. Alternatively the inventive compositions may be ultra-pasteurized at about 130° C. to about 150° C. for about 2 to about 5 seconds. Pasteurized and ultra-pasteurized compositions are stored at refrigerated temperatures from about 1° C. to about 7° C. Such heat treatment and subsequent refrigeration results in a shelf-life of up to about 16 weeks for the nonfrozen inventive products.

The inventive compositions may also be prepared by a sterilization process which includes high temperature treatment, such as at about 121° C. for about 15 to about 40 minutes (retort sterilization) or at about 135° C. to about 150° C. for about 2 to about 5 seconds (UHT and aseptic filling). With the latter sterilization, room-temperature storage of the inventive compositions is possible when used in conjunction with aseptic processing and packaging means.

The ultra-pasteurization and sterilization with aseptic filing can operate on the principle of direct steam injection or steam infusion and on indirect heating through use of a heat exchanger. Alternatively, ohmic or microwave heating may suitably be used.

As sued herein the term "shelf-life" of the product refers to as the time which a product can be stored without the quality falling below a certain acceptable, minimum level. The concept is subjective—the shelf-life can be very long if the criteria of product quality are low. The physical and chemical limiting factors of shelf-life are gelling, increase of viscosity, sedimentation, and phase separation. The organoleptic limiting factors are deterioration of taste, smell, and color.

The containers for packaging of nutritional milk products of the present invention can include any suitable container for storing food products. Some non-limiting examples include a gable-top carton, a plastic container, a glass container, a cardboard container, a metal container, a metal can or a paper container. The container may be any suitable enclosure such as a jar, a can, a bottle or a sealed film (plastic or plastic with a metallized layer).

The compositions of the present invention have been formulated such that the resultant pH is essentially neutral, e.g., about 5.5 to about 7.5. Preservation of the inventive compositions is accomplished by pasteurization and refrigerated storage, ultra-pasteurization and refrigerated storage or sterilization methods and is not dependent on acidic pH for preservation.

The compositions of the present invention can suitably include milk from a variety of sources and of different types. For example, the milk in the inventive compositions can include fat free milk, low fat milk, full fat milk, lactose-free milk (produced by hydrolyzing the lactose by lactase enzyme to glucose and galactose, or other method), concentrated milk, dry milk or organic milk. Fatfree milk is nonfat or skim milk product. Low-fat milk is typically defined as milk that contains from about 1% to about 2% fat. Fullfat milk often contains about 3.5% fat. The animal source of the milk is typically a cow, but the inventive compositions are not limited just to cow's milk. For example, milk from sheep, goat, buffalo, camel, llama, mare, or deer may suitably be used. As used herein, the term "organic" refers to a food, such as a milk, produced without the use of pesticides, chemical fertilizers, herbicides or fungicides. Typically, land on which milk-producing animals are raised and grains or grasses used to feed these animals should be free of these prohibited substances, e.g., pesticides, chemical fertilizers, herbicides or fungicides, for a number of years, often three years, prior to the milk being labeled as organic. Such organic milk is usually produced from animals that are substantially free of synthetic hormones, such as recombinant bovine somatotropin hormone (rbST/rBGH), and antibiotics.

The compositions of the present invention can be formulated into different types of dairy products. For example, the dairy product can be an unflavored or a flavored milk. Additionally, the dairy product can be a dairy drink, dairy beverage or a dairy cocktail. Such drinks, beverages or cocktails are products that contain the inventive compositions in a diluted form. Such diluted forms can include, as nonlimiting examples, a fruit juice or a carbonated soda as a diluent combined with the inventive compositions.

The inventive compositions can also be frozen to yield an ice cream or other frozen dessert. The ice creams can be formulated into a standard ice cream containing about 10% milkfat, a premium ice cream containing about 15% milkfat and a super premium ice cream containing about 17% milkfat. Other milkfat levels are contemplated with the inventive compositions. Additionally, non-dairy fats, as example for use in mellorine, are also contemplated. Furthermore, other frozen desserts, such a sherbets, sundaes, or partially frozen desserts, such as milk shakes, may suitably be made from the inventive compositions.

Additionally, the incentive compositions can be formulated into a yogurt. Yogurt is produced by culturing the compositions of the present invention with a bacterial culture such as lactic acid-producing bacteria, *Lactobacillus bulgaricus* and *Streptococcus thermophilus*. Additionally, other nonlimiting examples of probiotic microorganisms include Bifidobacterium spp., *Lactobacillus acidophilus* and *Bifidobacterium bifidum*. Furthermore, probiotic microorganisms can include bacteria that produce therapeutic yogurts. Such microorganism such as, for example, *str. salivarius ssp. thermophilus, Lb. acidophilus, B. bifidium*, in therapeutic yogurts are able to survive transit through the stomach, remain active in the presence of bile and have the ability to colonize the intestine. Furthermore, an organic yogurt, which is made from organic milk, may contain microorganisms such as, *S. Thermophilus, L. Bulgaricus, L. Acidophilus, Bifidus, L. Casei, L. Reuteri*. Prebiotic ingredients should be present to allow the probiotic microorganisms to remain active within the yogurt. As used herein the term "Prebiotic" refers to a non-digestive food that beneficially affects the host by selectively stimulating the growth and/or activity of one or a limited number of bacteria in the colon, such as fructo-oligosaccharides. As sued herein the term "probiotic" refers to a mono or mixed culture of live microorganisms, when applied to man or animal, beneficially affects the host by improving the properties of the indigenous microflora, such as bifidobacterium.

Yogurts using the inventive compositions can be set yogurts where the fermentation occurs in the final retail container or stirred yogurts where the fermentation occurs in bulk prior to packaging. Furthermore, these yogurts can contain flavors or fruits, can be frozen to provide a frozen yogurt or can be in the form of a drinkable fluid to provide a drinkable yogurt.

The protein source may be selected from a variety of materials, including without limitation, milk protein, whey protein, caseinate, soy protein, egg whites, gelatins, collagen and combinations thereof. Included in the protein source are lactose-free skim milk, milk protein isolate, and whey protein isolate. The inventive compositions can be fortified with these proteins. It is also contemplated to use soy milk with the present inventive compositions. As used herein, soy milk refers to a liquid made by grinding dehulled soy beans, mixing with water, cooking and recovering the dissolved soy milk out of the beans. Such soy milk can be formed into a milk-like product, which has similar taste, texture and appearance to animal (dairy) milk, but is essentially free of animal (dairy) milk. Furthermore, a dairy-like product, which as used herein refers to a product having similar taste, texture and appearance to dairy products made from animal milk, but does not contain animal milk, can be made form such milk-like products.

The carbohydrate source useful in the present invention may be selected from a wide variety of materials such as sucrose, corn syrup solids, glucose, fructose, maltodextrin and combinations thereof.

Artificial sweeteners such as saccharine, aspartame, asulfame K, sucrolose and their combination, as well as others, may be incorporated to enhance the organoleptic and sweetness quality of the compositions. Various fiber sources may be included in the compositions of the present invention. These sources may be selected from such materials as oat fiber, soy fiber, guar gum, pectin, soy polysaccharides, gum arabic, hydrolyzed fibers and the like. Cellulose, hemicellulose, hydrocollides, methylcellulose, carboxymethyl cellulose and the like are contemplated. Also useful are fructo-oligosaccharides.

Compositions of the present invention can be formulated into a variety of different product forms. For example, forms an include, but are not limited to, high protein and fiber-containing, fat-free (skim), 1% low fat, 2% low fat, full fat (3.4%), skim plus nonfat milk solids and lactose-free skim milks. Furthermore, where fatfree (nonfat or skim) milk is used, the milk may be partially evaporated or has added nonfat milk solids to yield a product with a rich creamy taste. The compositions can be flavored with natural or artificial ingredients. Such ingredients may be combined with the inventive compositions to form a substantially uniform flavored product or may be present in a nonuniform manner, such as fruit on the bottom of a inventive yogurt composition. Nonlimiting examples of flavored compositions include chocolate, strawberry, peach, raspberry, vanilla, banana, coffee, mocha and combinations thereof.

In a preferred embodiment, a nutritional dairy-product having a composition which includes a milk and being thermally treated under conditions of pasteurization, ultra-pasteurization, or sterilization comprising, per serving size: from about 0.1% to about 20% of the daily value of Sodium, Potassium, vitamin A, and vitamin C; from about 0.1% to about 40% of the daily value of Calcium; from about 0.1% to about 20% of the daily value of iron; from about 0.1% to about 30% of the daily value of vitamin D; from about 0.1% to about 20% of the daily value of vitamin E, vitamin K, and Thiamine; from about 0.1% to about 30% of the daily value of Riboflavin; from about 0.1% to about 20% of the daily value of Niacin, vitamin B6, Folate, vitamin B12, Biotin, and Pantothenic acid; from about 0.1% to about 30% of the daily value of Phosphorus; and from about 0.1% to about 20% of the daily value of Iodine, Magnesium, Zinc, Selenium, Copper, Manganese, Chromium, Molybdenum, and Chloride; wherein the present daily value (D.V.) is based on a 2,000 calorie diet. The service size for a milk is about one cup. The serving size for a yogurt is about one cup. The serving size for an ice cream or frozen dessert is about one-half (½) cup.

At the first gland, one may think higher concentration of vitamins and minerals (e.g, 35 to 50% D.V. or even higher) is more nutritious or has a better market appeal. However, over fortification of milk products is not recommended for the following reasons:

1. Regular diet provides the majority of vitamins and minerals. The goal of the inventive composition is not to substitute regular diet, but to ensure that no essential vitamins and minerals will be missing in the diet of the public.
2. Social responsibility dictates that for the long-term consumption by the public, milk products be moderately fortified with vitamins and minerals. Mild fortification of milk products with vitamins and minerals will prevent over consumption of these nutrients by public.
3. Vitamins and minerals are naturally and inherently "bad-tasting" substances. Mild fortification will not result in off taste of nutritional milk products.
4. Higher usage of vitamins and minerals means higher cost of ingredients.

In view of this rationale for fortification and against over-fortification, the inventive compositions, as shown in Table 5, contain about 10 to 25 percent of the daily value of essential vitamins and essential minerals. Most of the essential vitamins and essential minerals are provided at about 10 percent of the daily value, but some essential vitamins and minerals, such as riboflavin, vitamin B12, vitamin D, calcium and phosphorus, are provided at higher concentrations because of the inherent properties of milk and consumer expectations. Nevertheless, the inventive compositions contain all essential vitamins and essential minerals in scientifically sound and socially responsible quantities.

Essential macronutrients are included in the inventive compositions. Levels of the essential macronutrients vary with the product profile.

Antioxidants useful in the present invention include, without limitation, butylhydroxy anisole (BHA), butylhydroxy toluene (BHT), tertiary butyl hydroquinone (TBHQ), propyl gallate and combinations thereof. Natural antioxidants can also be included through additional amounts of vitamin C, vitamin E, beta-carotene, selenium, zinc and combinations thereof. Various herbs, herb extracts, botanicals, botanical extracts, amino acids and the like, and combinations thereof, can also be included for their intended functions and various products using such dietary supplements can be formulated therefrom.

Various non-nutritive components can be included in the inventive compositions. For example, fillers, coloring agents, flavors, emulsifiers and the like are useful. Other nutritionally valuable, but non-essential components can be added, included choline, taurine, L-carnitine and the like. Combinations of these non-nutritive and non-essential components are contemplated.

Various nutraceuticals and phytochemicals can be incorporated into the inventive compositions for their intended function. Furthermore, it is contemplated that the inventive compositions can be used in other dairy products, such as but not limited to cheeses, creams, custards, and the like.

EXAMPLES

Batching and Processing Procedure

Proper batching is of utmost importance. For preparation of all pasteurized and/or ultra-pasteurized complete nutritional milk products, the total processing system was cleaned (CIP=Clean-In-Place).

for the preparation of all pasteurized and/or ultra-pasteurized complete nutritional milk products, high quality, food-grade ingredient were used. Order of addition of ingredients, their physical structure, temperature, and rate of addition are also very important.

A milk was the first ingredient to be introduced into the batching container. Although the batch volume could be adjusted at the end of the batching process, it is preferred that the amount of milk is precalculated in a way that addition of other ingredients automatically brings the volume of the batch to the desirable level.

Proteins, fats, carbohydrates, minerals, flavors, colors, and vitamins are added sequentially. After the addition of each ingredient, the combination was mixed or homogenized before the next ingredient was added to the system.

Upon obtaining a homogeneous batch of unprocessed complete nutritional milk product with desirable profile of nutrients and functional ingredients, the batch is immediately pasteurized (85° C. for 30 seconds) and/or ultra-pasteurized (135–150° C. for up to 5 seconds). The pasteurized and/or ultra-pasteurized nutritional milk product is either promptly cooled and continuously kept at refrigerated temperature (1–7° C., preferably 2–3° C.); or promptly frozen and continuously kept a freezing temperature (−18° C); and/or while still warm (about 55° C.), is cultured and kept at 37° C. for several hours before cooled to refrigerated temperatures.

Example 1A

Pursuing the batching and processing guideline explained above, a fatfree complete nutritional milk composition was developed. The ingredients, including fatfree (skim) milk, used for the preparation of this product is shown in Table 8.

Example 1B

Pursuing the batching and processing guideline explained above, a fatfree complete nutritional milk composition was developed. The ingredients, including fatfree milk with nonfat milk solids, used for the preparation of this product is shown in Table 9.

Example 1C

Pursuing the batching and processing guideline explained above, a fatfree complete nutritional milk composition was developed. The ingredients, including lactose-free fatfree milk, used for the preparation of this product is shown in Table 10.

Example 1D

Pursuing the batching and processing guideline explained above, a lowfat (1% fat) complete nutritional milk composition was developed. The ingredients, including 1% fat milk, used for the preparation of this product is shown in Table 11.

Example 1E

Pursuing the batching and processing guideline explained above, a lowfat (2% fat) complete nutritional milk composition was developed. The ingredients, including 2% fat milk, used for the preparation of this product is shown in Table 12.

Example 1F

Pursuing the batching and processing guideline explained above, a fullfat (3.4% fat) complete nutritional milk composition was developed. The ingredients, including fullfat (3.4% fat) milk, used for the preparation of this product is shown in Table 13.

Example 2A

Pursuing the batching and processing guideline explained above, a lowfat (1% fat) complete nutritional milk (chocolate flavor) composition was developed. The ingredients, including 1% fat chocolate milk, used for the preparation of this product is shown in Table 14.

Example 2B

Pursuing the batching and processing guideline explained above, a lowfat (1% fat) complete nutritional milk (strawberry flavor) composition as developed. The ingredients, including 1% fat strawberry milk, used for the preparation of this product is shown in Table 15.

Example 2C

Pursuing the batching and processing guideline explained above, a lowfat (1% fat) complete nutritional milk (vanilla flavor) composition was developed. The ingredients, including 1% fat vanilla milk, used for the preparation of this product is shown in Table 16.

Example 2D

Pursuing the batching and process guideline explained above, a lowfat (1% fat) complete nutritional milk (banana flavor) composition was developed. The ingredients, including 1% fat banana milk, used for the preparation of this product is shown in Table 17.

Example 3A

Pursuing the batching and processing guideline explained above, a complete nutritional light vanilla ice cream composition was developed. The ingredients, including full fat milk and Half & Half, used for the preparation of this product is shown in Table 18.

Example 3B

Pursing the batching and processing guideline explained above, a fat-free, lactose-free, complete nutritional chocolate fudgesicle ice cream composition was developed. The ingredients, including 100% fat-free, lactose-free milk, used for the preparation of this product is shown in Table 19.

Example 3C

Pursuing the batching and processing guideline explained above, a lowfat, complete nutritional peach frozen yogurt composition was developed. The ingredients, including lowfat (2%) vanilla yogurt, used for the preparation of this product is shown in Table 20.

Example 4A

Pursuing the batching and processing guideline explained above, a fatfree (nonfat or skim), complete nutritional vanilla yogurt composition was developed. The ingredients, including fatfree (skim) milk, used for the preparation of this product is shown in Table 21.

Example 4B

Pursuing the batching and processing guideline explained above, a 1% fat, complete nutritional strawberry yogurt compositions was developed. The ingredients, including 1% fat milk and strawberry preserve, used for the preparation of this product is shown in Table 22.

Example 4C

Pursuing the batching and processing guideline explained above, a 2% fat, complete nutritional raspberry yogurt composition was developed. The ingredients, including 2% fat milk and raspberry preserve, used for the preparation of this product is shown in Table 23.

Example 4D

Pursing the batching and processing guideline explained above, a full-fat, complete nutritional organic yogurt composition was developed. The ingredients, including fullfat organic milk, used for the preparation of this product is shown in Table 24.

Although this invention has certain preferred embodiments, it will be obvious to those skilled in the art that various changes and modifications may be made therein without departing from the invention, and all such changes and modifications are intended to fall within the true spirit and scope of the invention.

TABLE 1

The list of nutritionally essential macronutrients and micronutrients, as described in the Code of Federal Regulation (21 C.F.R. 101.9, 1998).

| Essential Nutrient | 100% (D.V.)* |
|---|---|
| Total Fat | 65 g |
| Saturated Fat | 20 g |
| Cholesterol | 300 mg |
| Sodium | 2,400 mg |
| Potassium | 3,500 mg |
| Total Carbohydrate | 300 g |
| Dietary Fiber | 25 g |
| Sugars | |
| Protein | 50 g |
| Vitamin A | 5,000 IU** |
| Vitamin C | 60 mg |
| Calcium | 1,000 mg |
| Iron | 18 mg |
| Vitamin D | 400 IU** |

TABLE 1-continued

The list of nutritionally essential macronutrients and micronutrients, as described in the Code of Federal Regulation (21 C.F.R. 101.9, 1998).

| Essential Nutrient | 100% (D.V.)* |
|---|---|
| Vitamin E | 30 IU** |
| Vitamin K | 80 mcg |
| Thiamine (Vitamin B1) | 1.5 mg |
| Riboflavin (Vitamin B2) | 1.7 mg |
| Niacin | 20 mg |
| Vitamin B6 | 2.0 mg |
| Folate | 400 mcg |
| Vitamin B12 | 6.0 mcg |
| Biotin | 300 mcg |
| Pantothenic Acid | 10 mg |
| Phosphorus | 1,000 mg |
| Iodine | 150 mcg |
| Magnesium | 400 mg |
| Zinc | 15 mg |
| Selenium | 70 mcg |
| Copper | 2.0 mg |
| Manganese | 2.0 mg |
| Chromium | 120 mcg |
| Molybdenum | 75 mcg |
| Chloride | 3,400 mg |

*) Percent Daily Values are based on a 2,000 calorie diet.
**) 1 International Unit (IU) of vitamin A = 0.3 mcg of all-trans retinol = 0.6 mcg of all trans beta-carotene
1 International Unit (IU) of vitamin D = 0.025 mcg cholecalciferol
1 International Unit (IU) of vitamin E = 1 mg of all-rac-alpha Tocopherol acetate

TABLE 2A

Nutrition Facts of Commercially Available Flavored Milks

| COMPANY PRODUCT | | | Nestle Quick ® | Hershey's Reduced Fat | Yoo-Hoo Yoo-Hoo | Wawa Dairy 1% Milkfat | Sealtest 1% Milkfat |
|---|---|---|---|---|---|---|---|
| NUTRITION FACTS Serving Size. | | | (chocolate) cup (240 ml) | (chocolate) cup (240 ml) | (chocolate) 8 fl oz (240 ml) | (chocolate) Cup (240 ml) | (chocolate) Container (237 ml) |
| Serving per container | | | two | two | four | two | one |
| Calories | 2,000 | | 230 | 190 | 130 | 160 | 180 |
| Calories from Fat | 600 | | 70 | 40 | 10 | 20 | 25 |
| | | % DV* | % DV | % DV | % DV | % DV | % DV |
| Total Fat | 65 g | 100% | 12 | 7 | 1 | 5 | 4 |
| Saturated Fat | 20 g | 100% | 25 | 15 | 3 | 8 | 9 |
| Cholesterol | 300 mg | 100% | 10 | 5 | 0 | 2 | 4 |
| Sodium | 2,400 mg | 100% | 5 | 6 | 7 | 8 | 10 |
| Potassium | 3,500 mg | 100% | | | 4 | | |
| Total Carbohydrate | 300 g | 100% | 11 | 10 | 10 | 9 | 10 |
| Dietary Fiber | 25 g | 100% | 4 | 4 | 0 | 0 | 0 |
| Sugars | g | | 30 g | 25 g | 20 g | 26 g | 25 g |
| Protein | 50 | 100% | 14 | 16 | 4 | 16 | 20 |
| Vitamin A | 5,000 IU** | 100% | 6 | 10 | 10 | 10 | 10 |
| Vitamin C | 60 mg | 100% | 0 | 0 | 10 | 4 | 4 |
| Calcium | 1,000 mg | 100% | 25 | 25 | 10 | 29 | 35 |
| Iron | 15 mg | 100% | 0 | 2 | 6 | 3 | 0 |
| Vitamin D | 400 IU** | 100% | | 25 | 10 | 25 | 25 |
| Vitamin E | 30 IU** | 100% | | | | | |
| Vitamin K | 80 mcg | 100% | | | | | |
| Thiamine | 1.5 mg | 100% | | | | | |
| Riboflavin | 1.7 mg | 100% | | | | 10 | |
| Niacin | 20 mg | 100% | | | | 10 | |
| Vitamin B6 | 2.0 mg | 100% | | | | | |
| Folate | 400 mcg | 100% | | | | | |
| Vitamin B12 | 6.0 mcg | 100% | | | | | |
| Biotin | 300 mcg | 100% | | | | | |
| Pantothenic Acid | 10 mg | 100% | | | | | |
| Phosphorus | 1,000 mg | 100% | | | | 10 | |
| Iodine | 150 mcg | 100% | | | | | |
| Magnesium | 400 mg | 100% | | | | | |
| Zinc | 15 mg | 100% | | | | | |
| Selenium | 70 mcg | 100% | | | | | |
| Copper | 2.0 mg | 100% | | | | | |

TABLE 2A-continued

Nutrition Facts of Commercially Available Flavored Milks

| | | |
|---|---|---|
| Manganese | 2.0 mg | 100% |
| Chromium | 120 mcg | 100% |
| Molybdenum | 75 mcg | 100% |
| Chloride | 3,400 mg | 100% |

*) Percent Daily Values (D.V.) are based on a 2,000 calorie diet.
**) 1 International Unit (IU) of vitamin A = 0.3 mcg of all trans retinol = 0.6 mcg of all-trans beta-carotene
1 International Unit (IU) of vitamin D = 0.025 mcg of cholecalciferol
1 International Unit (IU) of vitamin E = 1 mg of all-rac-alpha Tocopherol acetate

TABLE 2B

Nutrition Facts of Commercially Available Flavored Milks

| COMPANY | | | Say Yes | Power Nutrition | Power Nutrition | Organic Cow of Vt | White Wave |
|---|---|---|---|---|---|---|---|
| PRODUCT | | | Fat Free | Power Milk Plus | Power Milk Fatfree | Organic Milk | Silk Soymilk |
| NUTRITION FACTS | | | (chocolate) | (vanilla) | (chocolate) | (chocolate) | (chocolate) |
| Serving Size. | | | 1 cup (236 ml) | 8 fl oz | 8 fl oz | 1 cup (236 ml) | 1 cup (237 ml) |
| Serving per container | | | four | one | one | four | four |
| Calories | 2,000 | | 150 | 250 | 160 | 280 | 108 |
| Calories from Fat | 600 | | 0 | 55 | 0 | 140 | 24 |
| | | % DV* | % DV | % DV | % DV | % DV | % DV |
| Total Fat | 65 g | 100% | 0 | 9 | 0 | 23 | 4 |
| Saturated Fat | 20 g | 100% | 0 | 8 | 0 | 48 | 0 |
| Cholesterol | 300 mg | 100% | 1 | 1 | 1 | 20 | 0 |
| Sodium | 2,400 mg | 100% | 6 | 7 | 6 | 5 | 4 |
| Potassium | 3,500 mg | 100% | | 13 | 14 | | |
| Total Carbohydrate | 300 g | 100% | 8 | 13 | 11 | 9 | 6 |
| Dietary Fiber | 25 g | 100% | 0 | 7 | 9 | 3 | 4 |
| Sugars | g | | 23 g | 25 g | 20 g | 25 g | 15 g |
| Protein | 50 g | 100% | 16 | 17 | 17 | 17 | 10 |
| Vitamin A | 5,000 IU** | 100% | 10 | 20 | 20 | 10 | 10 |
| Vitamin C | 60 mg | 100% | 0 | 50 | 50 | 4 | 0 |
| Calcium | 1,000 mg | 100% | 25 | 30 | 30 | 40 | 30 |
| Iron | 18 mg | 100% | 2 | 10 | 10 | | 2 |
| Vitamin D | 400 IU** | 100% | 25 | 35 | 35 | 4 | 30 |
| Vitamin E | 30 IU** | 100% | | 35 | 35 | | |
| Vitamin K | 80 mcg | 100% | | | | | |
| Thiamine | 1.5 mg | 100% | | 35 | 35 | | |
| Riboflavin | 1.7mg | 100% | | 50 | 50 | 30 | 30 |
| Niacin | 20 mg | 100% | | 35 | 35 | | |
| Vitamin B6 | 2.0 mg | 100% | | 35 | 35 | | |
| Folate | 400 mcg | 100% | | 4 | | | |
| Vitamin B12 | 6.0 mcg | 100% | | 50 | 50 | | 50 |
| Biotin | 300 mcg | 100% | | 35 | 35 | | |
| Pantothenic Acid | 10 mg | 100% | | 35 | 35 | | |
| Phosphorus | 1,000 mg | 100% | | 30 | 25 | | |
| Io dine | 150 mcg | 100% | | 35 | 35 | | |
| Magnesium | 400 mg | 100% | | 20 | 20 | | |
| Zinc | 15 mg | 100% | | 15 | 15 | | |
| Selenium | 70 mcg | 100% | | trace | trace | | |
| Copper | 2.0 mg | 100% | | 10 | 10 | | |
| Manganese | 2.0 mg | 100% | | trace | trace | | |
| Chromium | 120 mcg | 100% | | trace | trace | | |
| Molybdenum | 75 mcg | 100% | | trace | trace | | |
| Chloride | 3,400 mg | 100% | | | | | |

*) Percent Daily Values (D.V.) are based on a 2,000 calorie diet.
**) 1 International Unit (IU) of vitamin A = 0.3 mcg of all-trans retinol = 0.6 mcg of all-trans beta-carotene
1 International Unit (IU) of vitamin D = 0.025 mcg of cholecipherol
1 International Unit (IU) of vitamin E = 1 mg of all-rac-alpha Tocopherol acetate

TABLE 3A

Nutrition Facts of Commercially Available Ice Creams and Frozen Yogurts

| COMPANY | Good Humor | Edy's Grand | Ben & Jerry | Haagan-Daz | ConAgra |
|---|---|---|---|---|---|
| PRODUCT | Breyers ® | Edy's | Ben & Jerry | Haagan-Daz | Healthy Choice |

TABLE 3A-continued

Nutrition Facts of Commercially Available Ice Creams and Frozen Yogurts

| NUTRITION FACTS | | | DulceDe Leoche | Vanilla Bean | ChocChip Cookie | Pistachio | Vanilla Bean |
|---|---|---|---|---|---|---|---|
| Serving Size. | | | ½ cup | ½ cup | ½ cup | ½ cup | ½ cup |
| Serving per container | | | | | | | |
| Calories | 2,000 | | 160 | 140 | 300 | 290 | 110 |
| Calories from Fat | 600 | | 50 | 70 | 140 | 180 | 20 |
| | | % DV* | % DV | % DV | % DV | % DV | % DV |
| Total Fat | 65 g | 100% | 9 | 12 | 24 | 31 | 3 |
| Saturated Fat | 20 g | 100% | 19 | 23 | 49 | 55 | 5 |
| Cholesterol | 300 mg | 100% | 7 | 9 | 21 | 37 | 2 |
| Sodium | 2,400 mg | 100% | 3 | 1 | 4 | 3 | 2 |
| Potassium | 3,500 mg | 100% | | | | | |
| Total Carbohydrate | 300 g | 100% | 8 | 5 | 11 | 7 | 6 |
| Dietary Fiber | 25 g | 100% | | | | | 3 |
| Sugars | g | | 20 g | 14 g | 26 g | 18 g | 18 g |
| Protein | 50 g | | 4 | 4 | 10 | 10 | 6 |
| Vitamin A | 5,000 IU** | 100% | 6 | 6 | 15 | 15 | 6 |
| Vitamin C | 60mg | 100% | 0 | 0 | 0 | 0 | 0 |
| Calcium | 1,000 mg | 100% | 8 | 6 | 10 | 10 | 10 |
| Iron | 18 mg | 100% | 0 | 0 | 6 | 2 | 0 |
| Vitamin D | 400 IU** | 100% | | | | | |
| Vitamin E | 30 IU** | 100% | | | | | |
| Vitamin K | 80 mcg | 100% | | | | | |
| Thiamine | 1.5 mg | 100% | | | | | |
| Riboflavin | 1.7 mg | 100% | | | | | |
| Niacin | 20 mg | 100% | | | | | |
| Vitamin B6 | 2.0 mg | 100% | | | | | |
| Folate | 400 mcg | 100% | | | | | |
| Vitamin B12 | 6.0 mcg | 100% | | | | | |
| Biotin | 300 mcg | 100% | | | | | |
| Pantothenic Acid | 10 mg | 100% | | | | | |
| Phosphorus | 1,000 mg | 100% | | | | | |
| Iodine | 150 mcg | 100% | | | | | |
| Magnesium | 400 mg | 100% | | | | | |
| Zinc | 15 mg | 100% | | | | | |
| Selenium | 70 mcg | 100% | | | | | |
| Copper | 2.0 mg | 100% | | | | | |
| Manganese | 2.0 mg | 100% | | | | | |
| Chromium | 120 mcg | 100% | | | | | |
| Molybdenum | 75 mcg | 100% | | | | | |
| Chloride | 3,400 mg | 100% | | | | | |

*) Percent Daily Values (D.V.) are based on a 2,000 calorie diet.
**) 1 International Unit (IU) of vitamin A = 0.3 mcg of all-trans retinol = 0.6 mcg of all-trans beta-carotene
1 International Unit (IU) of vitamin D = 0.025 mcg of cholecalcipherol
1 International Unit (IU) of vitamin E = 1 mg of all-rac-alpha Tocopherol acetate

TABLE 3B

Nutrition Facts of Commercially Available Ice Creams and Frozen Yogurts

| COMPANY PRODUCT NUTRITION FACTS | | | Starbucks Starbucks coffee Java Toffee | Haagen-Daz Frozen Yogurt Vanilla | Haagen-Daz Frozen Yogurt Vanilla Raspberry Swirl |
|---|---|---|---|---|---|
| Serving Size. | | | ½ cup | ½ cup | ½ cup |
| Serving per container | | | | | |
| Calories | 2,000 | | 260 | 140 | 130 |
| Calories from Fat | 600 | | 130 | 0 | 0 |
| | | % DV* | % DV | % DV | % DV |
| Total Fat | 65 g | 100% | 22 | 0 | 0 |
| Saturated Fat | 20 g | 100% | 38 | 0 | 0 |
| Cholesterol | 300 mg | 100% | 21 | 1 | 1 |
| Sodium | 2,400 mg | 100% | 4 | 2 | 1 |
| Potassium | 3,500 mg | 100% | | | |
| Total Carbohydrate | 300 g | 100% | 10 | 10 | 9 |
| Dietary Fiber | 25 g | 100% | | | |
| Sugars | g | | 29 g | 17 g | 19 g |
| Protein | 50 g | 100% | 8 | 12 | 8 |
| Vitamin A | 5,000 IU** | 100% | 10 | 0 | 0 |
| Vitamin C | 60 mg | 100% | 0 | 0 | 0 |
| Calcium | 1,000 mg | 100% | 10 | 20 | 10 |
| Iron | 18 mg | 100% | 0 | 0 | 0 |

TABLE 3B-continued

Nutrition Facts of Commercially Available Ice Creams and Frozen Yogurts

| | | |
|---|---|---|
| Vitamin D | 400 IU** | 100% |
| Vitamin E | 30 IU** | 100% |
| Vitamin K | 80 mcg | 100% |
| Thiamine | 1.5 mg | 100% |
| Riboflavin | 1.7 mg | 100% |
| Niacin | 20 mg | 100% |
| Vitamin B6 | 2.0 mg | 100% |
| Folate | 400 mcg | 100% |
| Vitamin B12 | 6.0 mcg | 100% |
| Biotin | 300 mcg | 100% |
| Pantothenic Acid | 10 mg | 100% |
| Phosphorus | 1,000 mg | 100% |
| Iodine | 150 mcg | 100% |
| Magnesium | 400 mg | 100% |
| Zinc | 15 mg | 100% |
| Selenium | 70 mcg | 100% |
| Copper | 2.0 mg | 100% |
| Manganese | 2.0 mg | 100% |
| Chromium | 120 mcg | 100% |
| Molybdenum | 75 mcg | 100% |
| Chloride | 3,400 mg | 100% |

\*) Percent Daily Values (D.V.) are based on a 2,000 calorie diet.
\*\*) 1 International Unit (IU) of vitamin A = 0.3 mcg of all-trans retinol = 0.6 mcg of all-trans beta-carotene
1 International Unit (IU) of vitamin D = 0.025 mcg of cholecalcipherol
1 International Unit (IU) of vitamin E = 1 mg of all-rac-alpha Tocopherol acetate

TABLE 4A

Nutrition Facts of Commercially Available Yogurts

| COMPANY | | | Dannon ® | Colombo ® | Stonyfield | Dannon ® |
|---|---|---|---|---|---|---|
| PRODUCT | | | Regular Yogurt | Lowfat | Organic | 99% fatfree |
| NUTRITION FACTS | | | Plain | Plain | Plain | blueberry |
| Serving Size. | | | 1 cup | 1 cup | 1 cup | 1 cup |
| Serving per container | | | | | | |
| Calories | 2,000 | | 150 | 130 | 180 | 240 |
| Calories from Fat | 600 | | 70 | 35 | 90 | 25 |
| | | % DV* | % DV | % DV | % DV | % DV |
| Total Fat | 65 g | 100% | 13 | 6 | 15 | 4 |
| Saturated Fat | 20 g | 100% | 26 | 13 | 30 | 9 |
| Cholesterol | 300 mg | 100% | 11 | 5 | 13 | 5 |
| Sodium | 2,400 mg | 100% | 5 | 6 | 5 | 7 |
| Potassium | 3,500 mg | 100% | 11 | 13 | | 13 |
| Total Carbohydrate | 300 g | 100% | 4 | 4 | 4 | 15 |
| Dietary Fiber | 25 g | 100% | | | | 4 |
| Sugars | g | | 11 g | 11 g | 12 g | 43 g |
| Protein | 50 g | | 16 | 20 | 18 | 18 |
| Vitamin A | 5,000 IU** | 100% | 6 | 0 | 8 | 2 |
| Vitamin C | 60 mg | 100% | 4 | 0 | 4 | 4 |
| Calcium | 1,000 mg | 100% | 30 | 35 | 35 | 35 |
| Iron | 18 mg | 100% | 0 | 2 | 0 | 0 |
| Vitamin D | 400 IU** | 100% | | | | |
| Vitamin E | 30 IU** | 100% | | | | |
| Vitamin K | 80 mcg | 100% | | | | |
| Thiamine | 1.5 mg | 100% | | | | |
| Riboflavin | 1.7 mg | 100% | | 25 | | |
| Niacin | 20 mg | 100% | | | | |
| Vitamin B6 | 2.0 mg | 100% | | | | |
| Folate | 400 mcg | 100% | | | | |
| Vitamin B12 | 6.0 mcg | 100% | | | | |
| Biotin | 300 mcg | 100% | | | | |
| Pantothenic Acid | 10 mg | 100% | | | | |
| Phosph orus | 1,000 mg | 100% | | 25 | | |
| Iodine | 150 mcg | 100% | | | | |
| Magnesium | 400 mg | 100% | | | | |
| Zinc | 15 mg | 100% | | | | |
| Selenium | 70 mcg | 100% | | | | |
| Copper | 2.0 mg | 100% | | | | |
| Manganese | 2.0 mg | 100% | | | | |

TABLE 4A-continued

Nutrition Facts of Commercially Available Yogurts

| | | |
|---|---|---|
| Chromium | 120 mcg | 100% |
| Molybdenum | 75 mcg | 100% |
| Chloride | 3,400 mg | 100% |

*) Percent Daily Values (D.V.) are based on a 2,000 calorie diet.
**) 1 International Unit (IU) of vitamin A = 0.3 mcg of all-trans retinol = 0.6 mcg of all-trans beta-carotene
1 International Unit (IU) of vitamin D = 0.025 mcg of cholecalcipherol
1 International Unit (IU) of vitamin E = 1 mg of all-rac-alpha Tocopherol acetate

TABLE 4B

Nutrition Facts of Commercially Available Yogurts

| COMPANY<br>PRODUCT<br>NUTRITION FACTS<br>Serving Size.<br>Serving per container | | | Colombo ®<br>Fat Free<br>blueberry<br>1 cup | Breyer's<br>99% fatfree<br>Smooth & Creamy<br>1 cup |
|---|---|---|---|---|
| Cal ories | 2,000 | | 200 | 230 |
| Calories from Fat | 600 | | 0 | 20 |
| | | % DV* | % DV | % DV |
| Total Fat | 65 g | 100% | 0 | 3 |
| Saturated Fat | 20 g | 100% | 0 | 5 |
| Cholesterol | 300 mg | 100% | 2 | 7 |
| Sodium | 2,400 mg | 100% | 5 | 5 |
| Potassium | 3,500 mg | 100% | 11 | |
| Total Carbohydrate | 300 g | 100% | 14 | 15 |
| Dietary Fiber | 25 g | 100% | | |
| Sugars | g | | 36 g | 40 g |
| Protein | 50 g | 100% | 14 | 18 |
| Vitamin A | 5,000 IU** | 100% | 0 | 0 |
| Vitamin C | 60 mg | 100% | 0 | 0 |
| Calcium | 1,000 mg | 100% | 20 | 25 |
| Iron | 18 mg | 100% | 0 | 0 |
| Vitamin D | 400 IU** | 100% | | |
| Vitamin E | 30 IU** | 100% | | |
| Vitamin K | 80 mcg | 100% | | |
| Thiamine | 1.5 mg | 100% | | |
| Riboflavin | 1.7 mg | 100% | | |
| Niacin | 20 mg | 100% | | |
| Vitamin B6 | 2.0 mg | 100% | | |
| Folate | 400 mcg | 100% | | |
| Vitamin B12 | 6.0 mcg | 100% | | |
| Biotin | 300 mcg | 100% | | |
| Pantothenic Acid | 10 mg | 100% | | |
| Phosphorus | 1,000 mg | 100% | | |
| Iodine | 150 mcg | 100% | | |
| Magnesium | 400 mg | 100% | | |
| Zinc | 15 mg | 100% | | |
| Selenium | 70 mcg | 100% | | |
| Copper | 2.0 mg | 100% | | |
| Manganese | 2.0 mg | 100% | | |
| Chromium | 120 mcg | 100% | | |
| Molybednum | 75 mcg | 100% | | |
| Chloride | 3,400 mg | 100% | | |

*) Percent Daily Values (D.V.) are based on a 2,000 calorie diet.
**) 1 International Unit (IU) of vitamin A = 0.3 mcg of all-trans retinol = 0.6 mcg of all-trans beta-carotene
1 International Unit (IU) of vitamin D = 0.025 mcg of cholecalcipherol
1 International Unit (IU) of vitamin E = 1 mg of all-rac-alpha Tocopherol acetate

TABLE 5

Nutrition Facts of Complete Milk Products of the Present Invention

| COMPANY PRODUCT NUTRITION FACTS | | | Inventive Milk (chocolate) | Inventive Ice Cream (vanilla) | Inventive Yogurt (vanilla) |
|---|---|---|---|---|---|
| Serving Size. | | | 8 fl oz | ½ cup | 1 cup |
| Serving per container | | | one | | |
| Calories | 2,000 | | 170 | varies | varies |
| Calories from Fat | 600 | | 20 | varies | varies |
| % DV* | % DV | % DV | % DV | | |
| Total Fat | 65 g | 100% | 3 | varies | varies |
| Saturated Fat | 20 g | 100% | 7 | varies | varies |
| Cholesterol | 300 mg | 100% | 3 | varies | varies |
| Sodium | 2,400 mg | 100% | 8 | 5 | 5 |
| Potassium | 3,500 mg | 100% | 10 | 10 | 10 |
| Total Carbohydrate | 300 g | 100% | 10 | varies | varies |
| Dietary Fiber | 25 g | 100% | 0 | varies | varies |
| Sugars | g | | 30 g | varies | varies |
| Protein | 50 g | 100% | 16 | varies | varies |
| Vitamin A | 5,000 IU** | 100% | 10 | 10 | 10 |
| Vitamin C | 60 mg | 100% | 10 | 10 | 10 |
| Calcium | 1,000 mg | 100% | 25 | 25 | 25 |
| Iron | 15 mg | 100% | 10 | 10 | 10 |
| Vitamin D | 400 IU** | 100% | 25 | 25 | 25 |
| Vitamin E | 30 IU** | 100% | 10 | 10 | 10 |
| Vitamin K | 50 mcg | 100% | 10 | 10 | 10 |
| Thiamine | 1.5 mg | 100% | 10 | 10 | 10 |
| Riboflavin | 1.7 mg | 100% | 24 | 24 | 24 |
| Niacin | 20 mg | 100% | 10 | 10 | 10 |
| Vitamin B6 | 2.0 mg | 100% | 10 | 10 | 10 |
| Folate | 400 mcg | 100% | 10 | 10 | 10 |
| Vitamin B12 | 6.0 mcg | 100% | 14 | 14 | 14 |
| Biotin | 300 mcg | 100% | 10 | 10 | 10 |
| Pantothenic Acid | 10 mg | 100% | 10 | 10 | 10 |
| Phosphorus | 1,000 mg | 100% | 25 | 25 | 25 |
| Iodine | 150 mcg | 100% | 10 | 10 | 10 |
| Magnesium | 400 mg | 100% | 10 | 10 | 10 |
| Zinc | 15 mg | 100% | 10 | 10 | 10 |
| Selenium | 70 mcg | 100% | 10 | 10 | 10 |
| Copper | 2.0 mg | 100% | 10 | 10 | 10 |
| Manganese | 2.0 mg | 100% | 10 | 10 | 10 |
| Chromium | 120 mcg | 100% | 10 | 10 | 10 |
| Molybdenum | 75 mcg | 100% | 10 | 10 | 10 |
| Chloride | 3,400 mg | 100% | 10 | 10 | 10 |

*)Percent Daily Values (D.V.) are based on a 2,000 calorie diet.
**) 1 International Unit (IU) of vitamin A = 0.3 mcg of all-trans retinol = 0.6 mcg of all-trans beta-carotene
1 International Unit (IU) of vitamin D = 0.025 mcg of cholecalciferol
1 International Unit (IU) of vitamin E = 1 mg of all-rac-alpha Tocopherol acetate

TABLE 6

The source and quantity of each vitamin (in the vitamin premix) to be used in the inventive complete nutritional composition. Fine-tuning of vitamins and minerals concentration will be done in the final products.

| VITAMIN PREMIX* | UNIT | LABEL CLAIM UNITS/L | FOOD-GRADE SOURCE/COMPOUND | SOURCE TO VITAMIN CONVERSION FACTOR | PROCESSING & STORAGE OVERDOSE FACTOR | REQUIRED QUANTITY OF SOURCE/ COMPOUND |
|---|---|---|---|---|---|---|
| Vitamin A | IU | 2115 | Vitamin A Palmitate | 1.9 | 1.2 | 4822 |
| Vitamin C | mg | 25.4 | Sodium Ascorbate | 1.12 | 2 | 56.9 |
| Vitamin D | IU | 422.5 | Vitamin D3 (cholecalciferol) | 1 | 1.2 | 507 |
| Vitamin E | IU | 12.7 | alpha-tocopheryl acetate | 1 | 1.2 | 15.24 |
| Vitamin K | mcg | 33.84 | Phylloquinone (phytonadione) | 1 | 1.1 | 37.22 |
| Thiamine | mg | 0.635 | Thiamin monoitrate | 1 | 1.2 | 0.76 |
| Riboflavin | mg | 1.72 | | | | |
| Niacin | mg | 8.46 | Niacinamide | 1 | 1.1 | 9.31 |
| Vitamin B6 | mg | 0.846 | Pyridoxine hydrochloride | 1.21 | 1.2 | 1.23 |
| Folate | mcg | 1.69 | Folic Acid | 1 | 1.2 | 203 |
| Vitamin B12 | mcg | 3.55 | | | | |

TABLE 6-continued

The source and quantity of each vitamin (in the vitamin premix) to be used in the inventive complete nutritional composition. Fine-tuning of vitamins and minerals concentration will be done in the final products.

| VITAMIN PREMIX* | UNIT | LABEL CLAIM UNITS/L | FOOD-GRADE SOURCE/COMPOUND | SOURCE TO VITAMIN CONVERSION FACTOR | PROCESSING & STORAGE OVERDOSE FACTOR | REQUIRED QUANTITY OF SOURCE/ COMPOUND |
|---|---|---|---|---|---|---|
| Biotin | mcg | 127 | Biotin | 1 | 1.2 | 152.4 |
| Pantothenic Acid | mg | 4.23 | Calcium Pantothenate | 1.09 | 1.2 | 5.53 |

1 International Unit (IU) of vitamin A = 0.3 mcg of all-trans retinol = 0.6 mcg of all-trans beta-carotene
1 International Unit (IU) of vitamin D = 0.025 mcg cholecalciferol
1 International Unit (IU) of vitamin E = 1 mg of all-rac-alpha Tocopherol acetate
*Riboflavin and Vitamin B12 are generally fully contributed from milk.

TABLE 7

The source and quantity of each mineral (in the mineral premix) to be used in the inventive standard complete nutritional milk composition. Fine-tuning of vitamins and minerals concentration will be done in the final products.

| MINERALS PREMIX | UNIT | Label Claim Unit/L | Contribution Via milk* Unit/L | LABEL CLAIM MINUS CONTRIB. VIA MILK UNIT/L | FOOD-GRADE SOURCE/COMPOUND | MOL. WT. | SOURCE TO MINERAL CONVERSION FACTOR | REQUIRED QUANTITY OF SOURCE COMPOUND |
|---|---|---|---|---|---|---|---|---|
| Sodium | mg | 580 | 580 | 0 | | | | |
| Potassium | mg | 1400 | 1400 | 0 | | | | |
| Calcium | mg | 1177 | 1177 | 0 | | | | |
| Iron | mg | 7.6 | | 7.6 | Ferrous Sulfate (FeSO4.7H$_2$O) | 278 | 4.98 | 37 |
| Phosphorus | mg | 951 | 951 | 0 | | | | |
| Iodine | mcg | 63.45 | | 63.45 | Potassium Iodide (KI), anhydrous | 1.66 | 1.31 | 83.12 |
| Magnesium | mg | 169 | 121 | 48 | Magnesium Chloride (MgCl$_2$.6H$_2$O) | 203 | 8.46 | 407 |
| Zinc | mg | 6.35 | | 6.35 | Zinc Sulfate (ZnSO$_4$.1H$_2$O) | 179.44 | 2.76 | 17.53 |
| Selenium | mcg | 29.6 | | 29.6 | Sodium Selenate (Na$_2$SeO$_4$), anhydrous | 188.9 | 2.4 | 71 |
| Copper | mg | 0.846 | | 0.846 | Cupric Sulfate (CuSO$_4$), anhydrous | 159.6 | 2.51 | 2.12 |
| Manganese | mg | 0.846 | | 0.846 | Manganese Sulfate (MnSO$_4$.1H$_2$O) | 169 | 3.07 | 260 |
| Chromium | mcg | 50.76 | | 50.76 | Chromium Chloride [Cr(H$_2$O)4Cl$_2$].2H$_2$O | 266.45 | 5.12 | 2.6 |
| Molybdenum | mcg | 31.72 | | 31.72 | Sodium Molybdate (NaMoO$_4$.2H$_2$O) | 241.95 | 2.52 | 80 |
| Chloride | mg | 1187 | 1045 | 142 | | | | |

*) H. E. Swaiagood, Characteristics of edible fluids of animal origin: Milk, In: Food Chemistry, ed: O. R. Fennema, 2nd edition, Dekker, 1985

TABLE 8

Preparation and Processing Procedure for Example 1A

Vitamins & Minerals For Preparation of Fatfree Complete Nutritional Milk

| Ingredient/Premix | Unit | Batch (1 Liter) |
|---|---|---|
| Mineral Premix | g | 1 |
| MgCl$_2$ | g | 0.407 |
| Mineral Premix & Balance | g | 1.407 |
| Vitamin Premix | g | 1 |

Batching & Processing Procedure For Fatfree Complete Nutritional Milk

| Ingredient/Premix | Unit | Batch (1 Liter) | Pre-Batching Condition | Batching Process Conditions |
|---|---|---|---|---|
| Fatfree (skim) milk | ml | 950 | CIP the total system refrigerated | Add to the batching tank |
| Mineral & Balance Premix | g | 1.407 | Dissolve in 25 ml Room Temperature fatfree milk | Mix to uniformity |

TABLE 8-continued

Preparation and Processing Procedure for Example 1A

| Vitamin Premix | g | 1 | Dissolve in 25 ml Room Temperature fatfree milk | Mix to uniformity |
|---|---|---|---|---|
|  |  |  |  | PASTEURIZE & HOMOGENIZE: Heat (e.g., center of product to 85° C. for 30 seconds), and cool immediately. |

TABLE 9

Preparation and Processing Procedure for Example 1B

Vitamins & Minerals For Preparation of Fatfree Complete Nutritional Milk

| Ingredient/Premix | Unit | Batch (1 Liter) |
|---|---|---|
| Mineral Premix | g | 1 |
| MgCl$_2$ | g | 0.407 |
| Mineral Premix & Balance | g | 1.407 |
| Vitamin Premix | g | 1 |

Batching & Processing Procedure For Fatfree Complete Nutritional Milk

| Ingredient/Premix | Unit | Batch (1 Liter) | Pre-Batching Condition | Batching Process Conditions |
|---|---|---|---|---|
| Fatfree (with nonfat milk solid) milk | ml | 950 | CIP the total system refrigerated | Add to the batching tank |
| Mineral & Balance Premix | g | 1.407 | Dissolve in 25 ml Room Temperature fatfree (w/nonfat milk solid) milk | Mix to uniformity |
| Vitamin Premix | g | 1 | Dissolve in 25 ml Room Temperature fatfree (w/nonfat milk solid) milk | Mix to uniformity |
|  |  |  |  | PASTEURIZE & HOMOGENIZE: Heat (e.g., center of product to 85° C. for 30 seconds), and cool immediately. |

TABLE 10

Preparation and Processing Procedure for Example 1C

Vitamins & Minerals For Preparation of Fatfree Complete Nutritional Milk

| Ingredient/Premix | Unit | Batch (1 Liter) |
|---|---|---|
| Mineral Premix | g | 1 |
| MgCl$_2$ | g | 0.407 |
| Mineral Premix & Balance | g | 1.407 |
| Vitamin Premix | g | 1 |

Batching & Processing Procedure For Fatfree Complete Nutritional Milk

| Ingredient/Premix | Unit | Batch (1 Liter) | Pre-Batching Condition | Batching Process Conditions |
|---|---|---|---|---|
| Fatfree (lactose-free) milk | ml | 950 | CIP the total system refrigerated | Add to the batching tank |
| Mineral & Balance Premix | g | 1.407 | Dissolve in 25 ml Room Temperature fatfree (lactose-free) milk | Mix to uniformity |

TABLE 10-continued

Preparation and Processing Procedure for Example 1C

| Vitamin Premix | g | 1 | Dissolve in 25 ml Room Temperature fatfree (lactose-free) milk | Mix to uniformity |
|---|---|---|---|---|
| | | | | PASTEURIZE & HOMOGENIZE: Heat (e.g., center of product to 85° C. for 30 seconds), and cool immediately. |

TABLE 11

Preparation and Processing Procedure for Example 1D

Vitamins & Minerals For Preparation of Lowfat (1% Fat) Complete Nutritional Milk

| Ingredient/Premix | Unit | Batch (1 Liter) |
|---|---|---|
| Mineral Premix | g | 1 |
| $MgCl_2$ | g | 0.407 |
| Mineral Premix & Balance | g | 1.407 |
| Vitamin Premix | g | 1 |

Batching & Processing Procedure For Lowfat (1% Fat) Complete Nutritional Milk

| Ingredient/Premix | Unit | Batch (1 Liter) | Pre-Batching Condition | Batching Process Conditions |
|---|---|---|---|---|
| Lowfat (1% fat) milk | ml | 950 | CIP the total system refrigerated | Add to the batching tank |
| Mineral & Balance Premix | g | 1.407 | Dissolve in 25 ml Room Temperature 1% fat milk | Mix to uniformity |
| Vitamin Premix | g | 1 | Dissolve in 25 ml Room Temperature 1% fat milk | Mix to uniformity |
| | | | | PASTEURIZE & HOMOGENIZE: Heat (e.g., center of product to 85 ° C. for 30 seconds), and cool immediately. |

TABLE 12

Preparation and Processing Procedure for Example 1E

Vitamins & Minerals For Preparation of Lowfat (2% Fat) Complete Nutritional Milk

| Ingredient/Premix | Unit | Batch (1 Liter) |
|---|---|---|
| Mineral Premix | g | 1 |
| $MgCl_2$ | g | 0.407 |
| Mineral Premix & Balance | g | 1.407 |
| Vitamin Premix | g | 1 |

Batching & Processing Procedure For Lowfat (2% Fat) Complete Nutritional Milk

| Ingredient/Premix | Unit | Batch (1 Liter) | Pre-Batching Condition | Batching Process Conditions |
|---|---|---|---|---|
| Lowfat (2% fat) milk | ml | 950 | CIP the total system refrigerated | Add to the batching tank |
| Mineral & Balance Premix | g | 1.407 | Dissolve in 25 ml Room Temperature 2% fat milk | Mix to uniformity |
| Vitamin Premix | g | 1 | Dissolve in 25 ml Room Temperature 2% fat milk | Mix to uniformity |
| | | | | PASTEURIZE & HOMOGENIZE: Heat (e.g., center of |

TABLE 12-continued

Preparation and Processing Procedure for Example 1E

|  |  |  |
|---|---|---|
|  |  | product to 85° C. for 30 seconds), and cool immediately. |

TABLE 13

Preparation and Processing Procedure for Example 1F

Vitamins & Minerals For Preparation of Fullfat (3.4% Fat) Complete Nutritional Milk

| Ingredient/Premix | Unit | Batch (1 Liter) |
|---|---|---|
| Mineral Premix | g | 1 |
| $MgCl_2$ | g | 0.407 |
| Mineral Premix & Balance | g | 1.407 |
| Vitamin Premix | g | 1 |

Batching & Processing Procedure For Fullfat (3.4% Fat) Complete Nutritional Milk

| Ingredient/Premix | Unit | Batch (1 Liter) | Pre-Batching Condition | Batching Process Conditions |
|---|---|---|---|---|
| Fullfat (3.4% fat) milk | ml | 950 | CIP the total system refrigerated | Add to the batching tank |
| Mineral & Balance Premix | g | 1.407 | Dissolve in 25 ml Room Temperature fullfat milk | Mix to uniformity |
| Vitamin Premix | g | 1 | Dissolve in 25 ml Room Temperature fullfat milk | Mix to uniformity |
|  |  |  |  | PASTEURIZE & HOMOGENIZE: Heat (e.g., center of product to 85° C. for 30 seconds), and cool immediately. |

TABLE 14

Preparation and Processing Procedure for Example 2A

Vitamins & Minerals For Preparation of Lowfat (1% Fat) Complete Nutritional Milk

| (Chocolate Flavor) Ingredient/Premix | Unit | Batch (1 Liter) |
|---|---|---|
| Mineral Premix | g | 1 |
| $MgCl_2$ | g | 0.407 |
| Mineral Premix & Balance | g | 1.407 |
| Vitamin Premix | g | 1 |

Batching & Processing Procedure For Lowfat (1% Fat) Complete Nutritional Milk

| (Chocolate Flavor) Ingredient/Premix | Unit | Batch (1 Liter) | Pre-Batching Condition | Batching Process Conditions |
|---|---|---|---|---|
| Lowfat (1% fat) chocolate milk | ml | 950 | CIP the total system refrigerated | Add to the batching tank |
| Mineral & Balance Premix | g | 1.407 | Dissolve in 25 ml 1% fat chocolate milk | Mix to uniformity |
| Vitamin Premix | g | 1 | Dissolve in 25 ml 1% fat chocolate milk | Mix to uniformity |
|  |  |  |  | PASTEURIZE & HOMOGENIZE: Heat (e.g., center of product to 85° C. for 30 seconds), and cool immediately. |

TABLE 15

Preparation and Processing Procedure for Example 2B

Vitamins & Minerals For Preparation of Lowfat (1% Fat) Complete Nutritional Milk

| (Strawberry Flavor) Ingredient/Premix | Unit | Batch (1 Liter) |
|---|---|---|
| Mineral Premix | g | 1 |
| MgCl$_2$ | g | 0.407 |
| Mineral Premix & Balance | g | 1.407 |
| Vitamin Premix | g | 1 |

Batching & Processing Procedure For Lowfat (1% Fat) Complete Nutritional Milk

| (Strawberry Flavor) Ingredient/Premix | Unit | Batch (1 Liter) | Pre-Batching Condition | Batching Process Conditions |
|---|---|---|---|---|
| Lowfat (1% fat) strawberry milk | ml | 950 | CIP the total system refrigerated | Add to the batching tank |
| Mineral & Balance Premix | g | 1.407 | Dissolve in 25 ml 1% fat strawberry milk | Mix to uniformity |
| Vitamin Premix | g | 1 | Dissolve in 25 ml 1% fat strawberry milk | Mix to uniformity |
| | | | | PASTEURIZE & HOMOGENIZE: Heat (e g., center of product to 85° C. for 30 seconds), and cool immediately. |

TABLE 16

Preparation and Processing Procedure for Example 2C

Vitamins & Minerals For Preparation of Lowfat (1% Fat) Complete Nutritional Milk

| (Vanilla Flavor) Ingredient/Premix | Unit | Batch (1 Liter) |
|---|---|---|
| Mineral Premix | g | 1 |
| MgCl$_2$ | g | 0.407 |
| Mineral Premix & Balance | g | 1.407 |
| Vitamin Premix | g | 1 |

Batching & Processing Procedure For Lowfat (1% Fat) Complete Nutritional Milk

| (Vanilla Flavor) Ingredient/Premix | Unit | Batch (1 Liter) | Pre-Batching Condition | Batching Process Conditions |
|---|---|---|---|---|
| Lowfat (1% fat) vanilla milk | ml | 950 | CIP the total system refrigerated | Add to the batching tank |
| Mineral & Balance Premix | g | 1.407 | Dissolve in 25 ml 1% fat vanilla milk | Mix to uniformity |
| Vitamin Premix | g | 1 | Dissolve in 25 ml 1% fat vanilla milk | Mix to uniformity |
| | | | | PASTEURIZE & HOMOGENIZE: Heat (e.g., center of product to 85° C. for 30 seconds), and cool immediately. |

TABLE 17

Preparation and Processing Procedure for Example 2D

Vitamins & Minerals For Preparation of Lowfat (1% Fat) Complete Nutritional Milk

| (Banana Flavor) Ingredient/Premix | Unit | Batch (1 Liter) |
|---|---|---|
| Mineral Premix | g | 1 |
| MgCl$_2$ | g | 0.407 |
| Mineral Premix & Balance | g | 1.407 |
| Vitamin Premix | g | 1 |

Batching & Processing Procedure For Lowfat (1% Fat) Complete Nutritional Milk

| (Banana Flavor) Ingredient/Premix | Unit | Batch (1 Liter) | Pre-Batching Condition | Batching Process Conditions |
|---|---|---|---|---|
| Lowfat (1% fat) banana milk | ml | 950 | CIP the total system refrigerated | Add to the batching tank |
| Mineral & Balance Premix | g | 1.407 | Dissolve in 25 ml 1% fat banana milk | Mix to uniformity |
| Vitamin Premix | g | 1 | Dissolve in 25 ml 1% fat banana milk | Mix to uniformity |
| | | | | PASTEURIZE & HOMOGENIZE: Heat (e.g., center of product to 85° C. for 30 seconds), and cool immediately. |

TABLE 18

Preparation and Processing Procedure for Example 3A

Vitamins & Minerals For Preparation of Complete Nutritional light Vanilla Ice Cream

| Ingredient/Premix | Unit | Batch (1 Liter) | Comments |
|---|---|---|---|
| Mineral Premix | g | 2 | Since the serving size of ice cream/frozen dessert is ½ cup, we have doubled the amount of added vitamins and minerals (compared to nutritional milks), in order to have similar D.V. value in ½ cup serving of product. |
| MgCl$_2$ | g | 0.814 | |
| Mineral Premix & Balance | g | 2.814 | |
| Vitamin Premix | g | 2 | |

Batching & Processing Procedure For Complete Nutritional light Vanilla Ice Cream

| Ingredient/Premix | Unit | Batch (1 Liter) | Pre-Batching Condition | Batching Process Conditions |
|---|---|---|---|---|
| Half & Half (10% fat) | ml | 500 | refrigerated | Place in the batching tank |
| Fullfat Milk (3.4% fat) | ml | 250 | refrigerated | Add to the batching tank |
| Sugar | g | 185 | | Add to the batching tank |
| Vanilla extract | ml | 5 | | Add to the batching tank |
| Mineral & Balance Premix | g | 2.814 | Dissolve in 50 ml Room Temperature fullfat milk | Mix to uniformity/Add to batch |
| Vitamin Premix | g | 2 | Dissolve in 50 ml Room Temperature fullfat milk | Mix to uniformity/Add to batch |
| | | | | -Mix all ingredients to uniformity |
| | | | | -Pasteurize mix (85° C./30 sec) |
| | | | | -Pour mixture into freezer bowel of Cuisinart ® Frozen Yogurt-Ice Cream & Sorbet Maker |
| | | | | -Run the machine until Mixture thicken (About 25 minutes) |
| | | | | Transfer ice cream to an airtight container and place in freezer until firm |
| (2 hrs.) | | | | |

TABLE 19

Preparation and Processing Procedure for Example 3B

Vitamins & Minerals For Preparation of Complete Nutritional Fat-Free, Lactose-Free Chocolate Fudgesicle Ice Cream

| Ingredient/Premix | Unit | Batch (1 Liter) | Comments |
|---|---|---|---|
| Mineral Premix | g | 2 | Since the serving size of ice cream/frozen dessert is ½ |
| MgCl$_2$ | g | 0.814 | cup, we have doubled the amount of added vitamins |
| Mineral Premix & Balance | g | 2.814 | and minerals (compared to nutritional milks), in order |
| Vitamin Premix | g | 2 | to have similar D.V. value in ½ cup serving of product. |

Batching & Processing Procedure For Complete Nutritional Fat-Free, Lactose-Free Chocolate Fudgesicle Ice Cream

| Ingredient/Premix | Unit | Batch (1 Liter) | Pre-Batching Condition | Batching Process Conditions |
|---|---|---|---|---|
| 100% Fat-Free, Lactose-Free Milk | ml | 800 | CIP the total system refrigerated | Place in the batching tank |
| Chocolate Pudding Filling | g | 176 | Add to the batching tank | |
| Vanilla extract | ml | 2 | Add to the batching tank | |
| Mineral & Balance Premix | g | 2.814 | Dissolve in 50 ml Room Temperature FF/LF milk | Mix to uniformity/Add to batch |
| Vitamin Premix | g | 2 | Dissolve in 50 ml Room Temperature FF/LF milk | Mix to uniformity/Add to batch<br>-Mix all ingredients to uniformity<br>-Pasteurize mix (85° C./30 sec.)<br>-Pour mixture into freezer bowl of Cuisinart ® Frozen Yogurt-Ice Cream & Sorbet Maker<br>-Run the machine until Mixture thicken (about 25 minutes)<br>-Transfer ice cream to an airtight container and place in freezer until firm (2–4 hrs.) |

TABLE 20

Preparation and Processing Procedure for Example 3C

Vitamins & Minerals For Preparation of Complete Nutritional lowfat Peach Frozen Yogurt

| Ingredient/Premix | Unit | Batch (1 Liter) | Comments |
|---|---|---|---|
| Mineral Premix | g | 2 | Since the serving size of ice cream/frozen dessert is ½ cup, |
| MgCl$_2$ | g | 0.814 | we have doubled the amount of added vitamins and minerals |
| Mineral Premix & Balance | g | 2.814 | (compared to nutritional milks), in order to have similar D.V. |
| Vitamin Premix | g | 2 | value in ½ cup serving of product. |

Batching & Processing Procedure For Complete Nutritional lowfat Peach Frozen Yogurt

| Ingredient/Premix | Unit | Batch (1 Liter) | Pre-Batching Condition | Batching Process Conditions |
|---|---|---|---|---|
| Lowfat (2%) vanilla yogurt | g | 400 | CIP the total system refrigerated | Place in the batching tank |
| Minced canned peach | g | 425 | refrigerated | Add to the batching tank |
| Sugar | g | 75 | | Add to the batching tank |
| Mineral & Balance Premix | g | 1.407 | Dissolve in 50 ml 2% vanilla yogurt | Mix to uniformity/Add to batch |
| Vitamin Premix | g | 1 | Dissolve in 50 ml 2% vanilla yogurt | Mix to uniformity/Add to batch<br>Blend the mix to uniformity<br>-Pour mixture into freezer bowl of Cuisinart ® Frozen Yogurt Ice Cream & Sorbet |

TABLE 20-continued

Preparation and Processing Procedure for Example 3C

Maker
-Run the machine until
Mixture thicken (about 25
minutes)
-Transfer ice cream to an
airtight container and place
in freezer until firm (2 hrs.)

TABLE 21

Preparation and Processing Procedure for Example 4A

Vitamins & Minerals For Preparation of Fatfree (Nonfat or Skim) Complete Nutritional Vanilla Yogurt

| Ingredient/Premix | Unit | Batch (1 Liter) | Comments |
|---|---|---|---|
| Mineral Premix | g | 1 | We initially assume the same profile and |
| $MgCl_2$ | g | 0.407 | concentration of vitamins and minerals as milk. Fine |
| Mineral Premix & Balance | g | 1.407 | tuning of concentration of vitamins and minerals |
| Vitamin Premix | g | 1 | must be done upon analysis of the final products due to factors such as consumption of micronutrients by bacterial culture and acidity of the product. |

Batching & Processing Procedure For Fatfree (Nonfat or Skim) Complete Nutritional Vanilla Yogurt

| Ingredient/Premix | Unit | Batch (1 Liter) | Pre-Batching Condition | Batching Process Conditions |
|---|---|---|---|---|
| Fatfree (skim) milk | ml | 785 | CIP the total system Refrigerated | Add to the batching tank |
| Prebiotic ingredient (e.g., Fructo-oligosaccharides Raftilose ® P95) | g | 10 | | Add to the batching tank |
| Vanilla extract | g | 5 | | Add to the batching tank |
| Mineral & Balance Premix | g | 1.407 | Dissolve in 50 ml fatfree milk | Mix to uniformity/Add to batch |
| Vitamin Premix | g | 1 | Dissolve in 50 ml fatfree milk | Mix to uniformity/Add to batch Pasteurize (85° C. for 30 seconds), cool slowly. |
| Bacterial culture (skim yogurt containing *L. acidophilus*) | g | 100 | Stir to uniformity, room temperature | Add when the batch is still warm (55° C.), Store at 27° C. for 12 hrs, refrigerate afterwards. |

TABLE 22

Preparation and Processing Procedure for Example 4B

Vitamins & Minerals For Preparation of 1% Fat Complete Nutritional Strawberry (Fruit on Bottom = FOB) Yogurt

| Ingredient/Premix | Unit | Batch (1 Liter) | Comments |
|---|---|---|---|
| Mineral Premix | g | 1 | We initially assume the same profile and |
| $MgCl_2$ | g | 0.407 | concentration of vitamins and minerals as milk. Fine |
| Mineral Premix & Balance | g | 1.407 | tuning of concentration of vitamins and minerals |
| Vitamin Premix | g | 1 | must be done upon analysis of the final products due to factors such as consumption of micronutrients by bacterial culture and acidity of the product. |

TABLE 22-continued

Preparation and Processing Procedure for Example 4B

Batching & Processing Procedure For 1% Fat Complete Nutritional Strawberry
(Fruit on Bottom = FOB) Yogurt

| Ingredient/Premix | Unit | Batch (1 Liter) | Pre-Batching Condition | Batching Process Conditions |
|---|---|---|---|---|
| | | | CIP the total system | |
| Milk (1% fat) | ml | 800 | Refrigerated | Add to the batching tank |
| Mineral & Balance Premix | g | 1.407 | Dissolve in 50 ml 1% fat milk | Mix to uniformity/Add to batch |
| Vitamin Premix | g | 1 | Dissolve in 50 ml 1% fat milk | Mix to uniformity/Add to batch Pasteurize (85° C. for 30 seconds), cool slowly. |
| Bacterial culture (skim yogurt containing *L. Acidophilus*) | g | 100 | Stir to uniformity, room temperature | Add when the batch is still warm (55° C.), Pour batch gently on top of the Preserve (FOB), |
| Strawberry Preserve | g | 60 | | Store at 37° C. for 12 hrs, refrigerate afterwards. |

TABLE 23

Preparation and Processing Procedure for Example 4C

Vitamins & Minerals For Preparation of 2% Fat Complete Nutritional Raspberry
(Fruit on Bottom = FOB) Yogurt

| Ingredient/Premix | Unit | Batch (1 Liter) | Comments |
|---|---|---|---|
| Mineral Premix | g | 1 | We initially assume the same profile and |
| $MgCl_2$ | g | 0.407 | concentration of vitamins and minerals as milk. Fine |
| Mineral Premix & Balance | g | 1.407 | tuning of concentration of vitamins and minerals |
| Vitamin Premix | g | 1 | must be done upon analysis of the final products due to factors such as consumption of micronutrients by bacterial culture and acidity of the product. |

Batching & Processing Procedure For 2% Fat Complete Nutritional Raspberry
(Fruit on Bottom = FOB) Yogurt

| Ingredient/Premix | Unit | Batch (1 Liter) | Pre-Batching Condition | Batching Process Conditions |
|---|---|---|---|---|
| | | | CIP the total system | |
| Milk (2% fat) | ml | 800 | Refrigerated | Add to the batching tank |
| Mineral & Balance Premix | g | 1.407 | Dissolve in 50 ml 2% fat milk | Mix to uniformity/Add to batch |
| Vitamin Premix | g | 1 | Dissolve in 50 ml 2% fat milk | Mix to uniformity/Add to batch Pasteurize (85° C. for 30 seconds), cool slowly. |
| Bacterial culture (skim yogurt containing *L. Acidophilus*) | g | 1 00 | Stir to uniformity, room temperature | Add when the batch is still warm (55° C.). Pour batch gently on top of the Preserve (FOB), |
| Raspberry Preserve | g | 60 | | Store at 37° C. for 12 hrs, refrigerate afterwards. |

TABLE 24

Preparation and Processing Procedure for Example 4D

Vitamins & Minerals For Preparation of Full Fat Complete Nutritional Organic Yogurt

| Ingredient/Premix | Unit | Batch (1 Liter) | Comments |
|---|---|---|---|
| Mineral Premix | g | 1 | We initially assume the same profile and |
| MgCl$_2$ | g | 0.407 | concentration of vitamins and minerals as milk. Fine |
| Mineral Premix & Balance | g | 1.407 | tuning of concentration of vitamins and minerals |
| Vitamin Premix | g | 1 | must be done upon analysis of the final products due to factors such as consumption of micronutrients by bacterial culture and acidity of the product. |

Batching & Processing Procedure For Full Fat Complete Nutritional Organic Yogurt

| Ingredient/Premix | Unit | Batch (1 Liter) | Pre-Batching Condition | Batching Process Conditions |
|---|---|---|---|---|
| Fullfat Organic Milk (3.4%) | ml | 800 | CIP the total system Refrigerated | Add to the batching tank |
| Mineral & Balance Premix | g | 1.407 | Dissolve in 50 ml fullfat organic milk | Mix to uniformity/Add to batch |
| Vitamin Premix | g | 1 | Dissolve in 50 ml fullfat organic milk | Mix to uniformity/Add to batch Pasteurize (85° C. for 30 seconds), cool slowly. |
| Culture with Probiotic bacteria (e.g., bifidobacter): Fullfat organic yogurt (S. Thermophilus, L. Bulgaricus, L. Acidophilus, Bifidus, L. Casei, L. Reuteri) | g | 100 | Mix to uniformity, room temperature | Add when the batch is still warm (55° C.), Store at 37° C. for 12 hrs, refrigerate afterwards. |

What is claimed is:

1. A substantially stable nutritional dairy-product having a composition which includes a milk and being thermally treated under conditions of pasteurization, ultra-pasteurization or sterilization comprising, per serving size:
   a. from about 0.1% to about 20% of the daily value of Sodium;
   b. from about 0.1% to about 20% of the daily value of Potassium;
   c. from about 0.1% to about 20% of the daily value of vitamin A;
   d. from about 0.1% to about 20% of the daily value of vitamin C;
   e. from about 0.1% to about 40% of the daily value of Calcium;
   f. from about 0.1% to about 20% of the daily value of iron;
   g. from about 0.1% to about 30% of the daily value of vitamin D;
   h. from about 0.1% to about 20% of the daily value of vitamin E;
   i. from about 0.1% to about 20% of the daily value of vitamin K;
   j. from about 0.1% to about 20% of the daily value of Thiamine;
   k. from about 0.1% to about 30% of the daily value of Riboflavin;
   l. from about 0.1% to about 20% of the daily value of Niacin;
   m. from about 0.1% to about 20% of the daily value of, vitamin B6;
   n. from about 0.1% to about 20% of the daily value of Folate;
   o. from about 0.1% to about 20% of the daily value of vitamin B12;
   p. from about 0.1% to about 20% of the daily value of Biotin;
   q. from about 0.1% to about 20% of the daily value of Pantothenic acid;
   r. from about 0.1% to about 30% of the daily value of Phosphorus;
   s. from about 0.1% to about 20% of the daily value of Iodine;
   t. from about 0.1% to about 20% of the daily value of Magnesium;
   u. from about 0.1% to about 20% of the daily value of Zinc;
   v. from about 0.1% to about 20% of the daily value of Selenium;
   w. from about 0.1% to about 20% of the daily value of Copper;
   x. from about 0.1% to about 20% of the daily value of Manganese;
   y. from about 0.1% to about 20% of the daily value of Chromium;
   z. from about 0.1% to about 20% of the daily value of Molybdenum; and
   aa. from about 0.1% to about 20% of the daily value of Chloride;
   wherein the percent daily value is based on a 2,000 calorie diet.

2. The composition of claim 1 wherein said nutritional dairy-product is a milk.

3. The dairy-product of claim 2 wherein the serving size is about one cup.

4. The composition of claim 1 wherein said nutritional dairy-product is an ice cream, a frozen yogurt or a frozen dessert.

5. The dairy-product of claim 4 wherein the serving size is about one-half a cup.

6. The composition of claim 4 wherein said ice cream is selected from the group consisting of a standard ice cream, a premium ice cream, a super premium ice cream and combinations thereof.

7. The composition of claim 1 wherein said nutritional dairy-product is a yogurt.

8. The dairy-product of claim 7 wherein the serving size is about one cup.

9. The composition of claim 7 wherein said yogurt is selected from the group consisting of a set yogurt, a stirred yogurt, a fruit yogurt, a drinkable yogurt and combinations thereof.

10. The composition of claim 7 wherein said yogurt contains a probiotic microorganism, a prebiotic ingredient and combinations thereof.

11. The composition of claim 2 wherein the milk is selected from the group consisting of fatfree milk, lowfat milk, fullfat milk, lactose-free milk, concentrated milk, dry milk, organic milk and combinations thereof.

12. The composition of claim 11 wherein the fatfree milk contains added nonfat milk solids.

13. The composition of claim 11 wherein the fatfree milk is partially evaporated.

14. The composition of claim 1 wherein said dairy-product is a flavored dairy-product.

15. The composition of claim 14 wherein the flavor is selected from the group consisting of chocolate, strawberry, vanilla, banana, raspberry, coffee, mocha and combinations thereof.

16. The composition of claim 1, wherein the milk is selected from the group of animals consisting of cow, sheep, goat, buffalo, camel, llama, mare, deer and combinations thereof.

17. The composition of claim 1, wherein said milk is fortified with proteins.

18. The composition of clam 1 wherein said milk is fortified with dietary fiber.

19. The composition of claim 1, further including additional amounts of natural antioxidants selected from the group consisting of vitamin C, vitamin E, beta-carotene, selenium, zinc, and combinations thereof.

20. The compositions of claim 1, further including phenolic antioxidants selected from the group consisting of butylhydroxy anisole, butylhydroxy toluene, tertiary butyl hydroquinone, propyl gallate and combinations thereof.

21. The compositions of claim 1, further including an herb, an herb extract, a botanical, a botanical extract, an amino acid and combinations thereof.

22. The composition of claim 1, further including a phytochemical.

23. The composition of claim 1, further including a non-nutritive or non-essential component.

24. The composition of claim 1, further including a nutraceutical.

25. The composition of claim 2, further including an antimicrobial agent.

26. The composition of claim 1, wherein said nutritional dairy-product is a dairy drink, dairy beverage, or dairy cocktail.

27. The composition of claim 1, wherein said nutritional dairy product is pasteurized from about 75° C. to about 95° C. for about 15 to about 55 seconds.

28. The composition of claim 1, wherein said nutritional dairy-product is ultra-pasteurized from about 130° C. to about 150° C. for about 2 to about 5 seconds.

29. The composition of claim 28, wherein said ultra-pasteurization uses direct thermal treatment selected from the group consisting of steam injection or steam infusion.

30. The composition of claim 28, wherein said ultra-pasteurization uses indirect thermal treatment which comprises a heat exchanger.

31. The composition of claim 1, wherein said nutritional dairy-product is sterilized to be stored at room temperature.

32. The composition of claim 1, wherein said nutritional dairy-product is in a package assembly comprising a gable-top carton, a plastic container, a glass container, a paper container, a cardboard container or a metal container.

33. A substantially stable nutritional dairy-product according to claim 1 comprising, per serving size:

Sodium from about 5% to about 15%;
Potassium from about 5% to about 15%;
Vitamin A from about 5% to about 15%;
Vitamin C from about 5% to about 15%;
Calcium from about 25% to about 40%;
Iron from about 5% to about 15%;
Vitamin D from about 20% to about 30%;
Vitamin E from about 5% to about 15%;
Vitamin K from about 5% to about 15%;
Thiamine from about 5% to about 15%;
Riboflavin from about 20% to about 30%;
Niacin from about 5% to about 15%;
Vitamin B6 from about 5% to about 15%;
Folate from about 5% to about 15%;
Vitamin B12 from bout 10% to about 20%;
Biotin from about 5% to about 15%;
Pantothenic acid from about 5% to about 15%;
Phosphorus from about 20% to about 30%;
Iodine from about 5% to about 15%;
Magnesium from about 5% to about 15%;
Zinc from about 5% to about 15%;
Selenium from about 5% to about 15%;
Copper from about 5% to about 15%;
Manganese from about 5% to about 15%;
Chromium from about 5% to about 15%;
Molybdenum from about 5% to about 15%; and
Chloride from about 5% to about 15%;

wherein said percentages are based on daily value and the daily value is based on a 2,000 calorie diet.

34. A nutritional substantially stable product having a composition which includes soy milk comprising:

a. from about 0.1% to about 20% of the daily value of Sodium;

b. from about 0.1% to about 20% of the daily value of Potassium;

c. from about 0.1% to about 20% of the daily value of vitamin A;

d. from about 0.1% to about 20% of the daily value of vitamin C;

e. from about 0.1% to about 40% of the daily value of Calcium;

f. from about 0.1% to about 20% of the daily value of iron;

g. from about 0.1% to about 30% of the daily value of vitamin D;

h. from about 0.1% to about 20% of the daily value of vitamin K;

i. from about 0.1% to about 20% of the daily value of vitamin E;
j. from about 0.1% to about 20% of the daily value of Thiamine;
k. from about 0.1% to about 30% of the daily value of Riboflavin;
l. from about 0.1% to about 20% of the daily value of Niacin;
m. from about 0.1% to about 20% of the daily value of, vitamin B6;
n. from about 0.1% to about 20% of the daily value of Folate;
o. from about 0.1% to about 20% of the daily value of vitamin B12;
p. from about 0.1% to about 20% of the daily value of Biotin;
q. from about 0.1% to about 20% of the daily value of Pantothenic acid;
r. from about 0.1% to about 30% of the daily value of Phosphorus;
s. from about 0.1% to about 20% of the daily value of Iodine;
t. from about 0.1% to about 20% of the daily value of Magnesium;
u. from about 0.1% to about 20% of the daily value of Zinc;
v. from about 0.1% to about 20% of the daily value of Selenium;
w. from about 0.1% to about 20% of the daily value of Copper;
x. from about 0.1% to about 20% of the daily value of Manganese;
y. from about 0.1% to about 20% of the daily value of Chromium;
z. from about 0.1% to about 20% of the daily value of Molybdenum; and
aa. from about 0.1% to about 20% of the daily value of Chloride;

wherein the percent daily value is based on a 2,000 calorie diet.

* * * * *

UNITED STATES PATENT AND TRADEMARK OFFICE
CERTIFICATE OF CORRECTION

PATENT NO. : 6,030,650
DATED : February 29, 2000
INVENTOR(S) : Kamarei, A.R.

It is certified that error appears in the above-identified patent and that said Letters Patent is hereby corrected as shown below:

At column 2, line 66, the printed patent incorrectly reads "completer". The patent should read -- complete --.

At column 5, line 13, the printed patent incorrectly reads "3.5% fat". The patent should read -- 3.4% fat --.

At column 6, line 52, the printed patent incorrectly reads "an include". The patent should read -- can include --.

At column 7, line 21 the printed patent incorrectly reads "gland". The patent should read -- glance ---.

At column 8, line 21, the printed patent incorrectly reads "for". The patent should read -- For --.

Signed and Sealed this

Thirteenth Day of February, 2001

Attest:

NICHOLAS P. GODICI

Attesting Officer    Acting Director of the United States Patent and Trademark Office